(12) United States Patent
Redekop et al.

(10) Patent No.: US 12,114,592 B2
(45) Date of Patent: Oct. 15, 2024

(54) GROUND WORKING APPARATUS INCLUDING COULTER AND SHOVEL FOR USE WITH LIQUID FERTILIZER INJECTOR

(71) Applicant: J A REDEKOP HOLDINGS LTD., Winkler (CA)

(72) Inventors: Johan Redekop, Winkler (CA); Waldemar Berg, Winkler (CA)

(73) Assignee: J.A Redekop Holdings Ltd., Winkler (CA)

( * ) Notice: Subject to any disclaimer, the term of this patent is extended or adjusted under 35 U.S.C. 154(b) by 751 days.

(21) Appl. No.: 17/331,086

(22) Filed: May 26, 2021

(65) Prior Publication Data

US 2022/0377966 A1 Dec. 1, 2022

(51) Int. Cl.
| | | |
|---|---|---|
| *A01C 5/06* | (2006.01) | |
| *A01B 15/18* | (2006.01) | |
| *A01C 23/02* | (2006.01) | |

(52) U.S. Cl.
CPC ............. *A01C 5/064* (2013.01); *A01B 15/18* (2013.01); *A01C 23/02* (2013.01)

(58) Field of Classification Search
CPC .......... A01C 5/064; A01C 5/062; A01C 5/06; A01C 5/00; A01C 23/02; A01C 23/00; A01B 15/18; A01B 15/00
See application file for complete search history.

(56) References Cited

U.S. PATENT DOCUMENTS

| | | | |
|---|---|---|---|
| 3,292,562 A | * | 12/1966 | Clark .................... A01C 23/025 111/151 |
| 4,461,355 A | * | 7/1984 | Peterson ................ A01B 39/14 172/624.5 |
| 5,531,171 A | | 7/1996 | Whtiesel et al. |
| 6,325,156 B1 | | 12/2001 | Barry |

* cited by examiner

*Primary Examiner* — Christopher J. Novosad
(74) *Attorney, Agent, or Firm* — Ryan W. Dupuis; Kyle R. Satterthwaite; Ade & Company Inc.

(57) ABSTRACT

A ground working apparatus is supported on the toolbar of an agricultural implement for injecting liquid fertilizer into the ground. A disc arm is pivotally coupled to a mounting bracket on the toolbar to extend downwardly and rearwardly to a coulter disc rotatably supported on the lower end of the disc arm to cut the ground. An upright pivot assembly pivotally couples the upper end of the disc arm relative to the mounting bracket to pivot about an upright axis while preventing upward movement of the disc. A shank is pivotal on the disc arm to support a shovel trailing the disc to form an undercut trough connected to the ground cut formed by the coulter disc. A pressure mechanism prevents upward pivotal movement of the shovel relative to the disc arm until an upward pressure applied to the shovel exceeds a prescribed holding force of the pressure mechanism.

9 Claims, 6 Drawing Sheets

GROUND WORKING APPARATUS INCLUDING COULTER AND SHOVEL FOR USE WITH LIQUID FERTILIZER INJECTOR

FIELD OF THE INVENTION

The present invention relates to a ground working apparatus arranged to be supported on the toolbar of an agricultural implement for forming an undercut trough in the ground using a coulter disc followed by a shovel with a liquid fertilizer injector rearward of the shovel placing liquid fertilizer in the undercut trough.

BACKGROUND

Various types of flowable fertilizers, for example manure, ammonia containing liquids, and the like, are known to be applied to an agricultural field. In some instances, an implement is used to apply the fertilizer in which the implement includes tools for cutting openings in the ground followed by liquid injectors to inject fertilizer into the openings in the ground.

U.S. Pat. No. 5,531,171 by Whitesel et al and U.S. Pat. No. 6,325,156 by Barry each disclose examples of an applicator tool for an agricultural implement in which discs are used to cut an opening in the ground, followed by a shovel to widen the opening to inject fertilizer through an injector carried on a shank that the shovel is supported on. In each instance, the disc is carried on a disc arm that is intended to deflect upward when the disc encounters debris, however, the shovel is lifted from the ground with the disc arm so that the fertilizer is not properly injected below the surface of the ground each time the disc encounters even small obstacles.

SUMMARY OF THE INVENTION

According to one aspect of the invention there is provided a ground working apparatus for use with an agricultural implement having a toolbar arranged to be displaced across ground in a forward working direction, the apparatus comprising:

a mounting bracket arranged to be mounted on the toolbar in fixed relation to the toolbar;

a disc arm extending downwardly and rearwardly between an upper end of the disc arm and a lower end of the disc arm;

an upright pivot assembly pivotally coupling the upper end of the disc arm relative to the mounting bracket such that the disc arm is pivotal about an upright axis relative to the mounting bracket;

a coulter disc rotatably supported on the lower end of the disc arm to form a cut in the ground when displaced in the forward working direction;

the upright pivot assembly preventing upward movement of the coulter disc relative to the mounting bracket;

a tool shank extending downwardly and rearwardly between an upper end of the tool shank and a lower end of the tool shank;

a lateral pivot assembly pivotally coupling the upper end of the tool shank relative to the disc arm such that the tool shank is pivotal relative to the disc arm about a lateral axis while being pivotal with the disc arm about the upright axis of the upright pivot assembly;

a pressure mechanism arranged to prevent upward pivotal movement of the tool shank relative to the disc arm until an upward pressure applied to the tool shank exceeds a prescribed holding force of the pressure mechanism; and a shovel supported on the lower end of the tool shank to form an undercut trough connected to the cut in the ground for receiving fertilizer from a liquid fertilizer injector supported rearwardly of the tool shank.

By supporting the disc arm with an upright pivot assembly that prevents upward movement of the coulter disc relative to the disc arm, the disc acts to push most obstacles, for example rocks, deeper into the ground to clear a path for the following shovel and fertilizer injection. If a larger object is encountered, the disc is able to deflect laterally around the obstacle. In either instance, the shovel continues to inject fertilizer below the surface of the ground instead of being wasted at the surface of the ground.

Preferably the lateral axis of the lateral pivot assembly is adjacent to the upper end of the disc arm.

Preferably the lateral axis of the lateral pivot assembly is forward of the disc axis of the coulter disc.

The tool shank is curved about a center of curvature in which the center of curvature lies in proximity to the disc axis.

In the illustrated embodiment, the lower end of the disc arm may be spaced laterally outwardly from a plane of rotation of the coulter disc with the disc arm being sloped towards said plane of rotation from the lower end to the upper end of the disc arm.

The apparatus may be used with an agricultural implement in which the toolbar extends at a slope, non-perpendicularly to the forward working direction. In this instance, the mounting bracket is preferably arranged to mount onto the sloped toolbar to extend rearward from the toolbar in parallel with the forward working direction.

The disc arm is preferably pivotal about the upright axis through a range of at least 25 degrees from a neutral position of the disc arm in which the disc axis is oriented perpendicularly to the forward working direction.

When used in combination with a supply of liquid fertilizer in communication with the fertilizer injector supported on the tool shank, the fertilizer injector is preferably supported on the tool shank so as to be movable together with the shovel about the lateral axis of the lateral pivot assembly.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
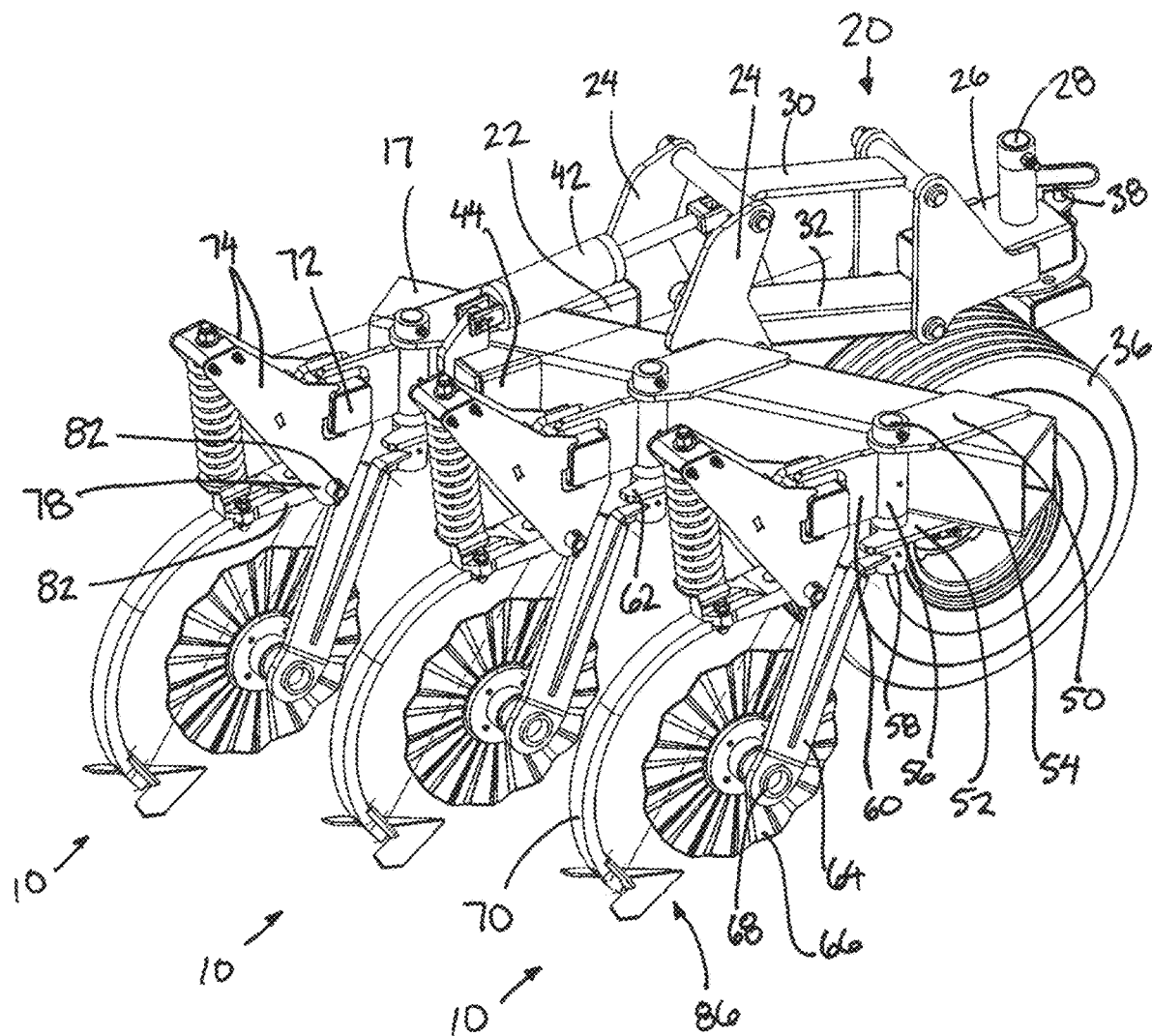
FIG. 1 is a perspective view of the ground working apparatus shown supported on a section of a toolbar of an agricultural implement.
Figure 2:
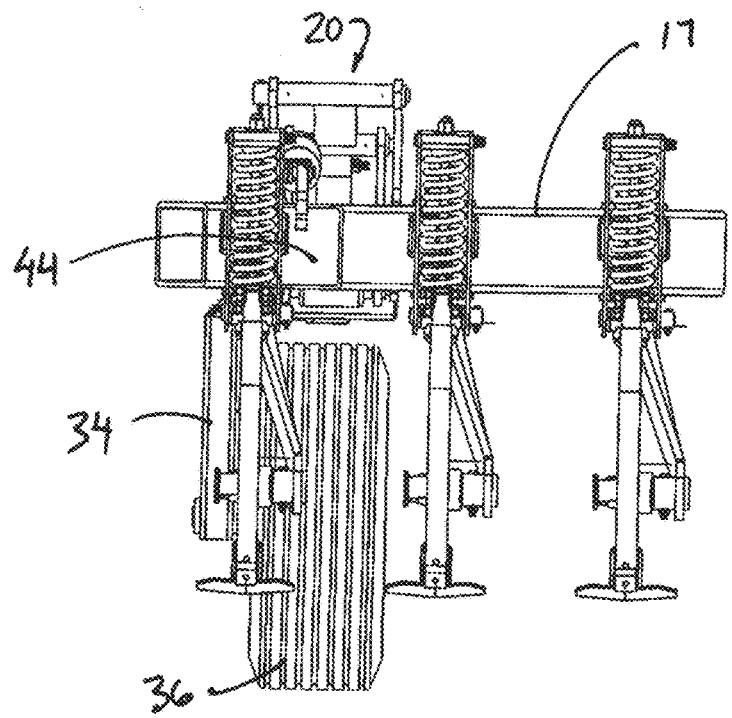
FIG. 2 is a rear elevational view of the ground working apparatus according to FIG. 1.

Referring to the accompanying figures, there is illustrated a ground working apparatus generally indicated by reference numeral 10. The apparatus 10 is particularly suited for use with an agricultural implement 12 arranged to be towed across ground in a forward working direction F by an agricultural tractor 14, for injecting a liquid fertilizer product, for example liquid manure or an ammonia containing liquid product, into the ground as the apparatus is displaced in the forward working direction with the implement.

Figure 7:
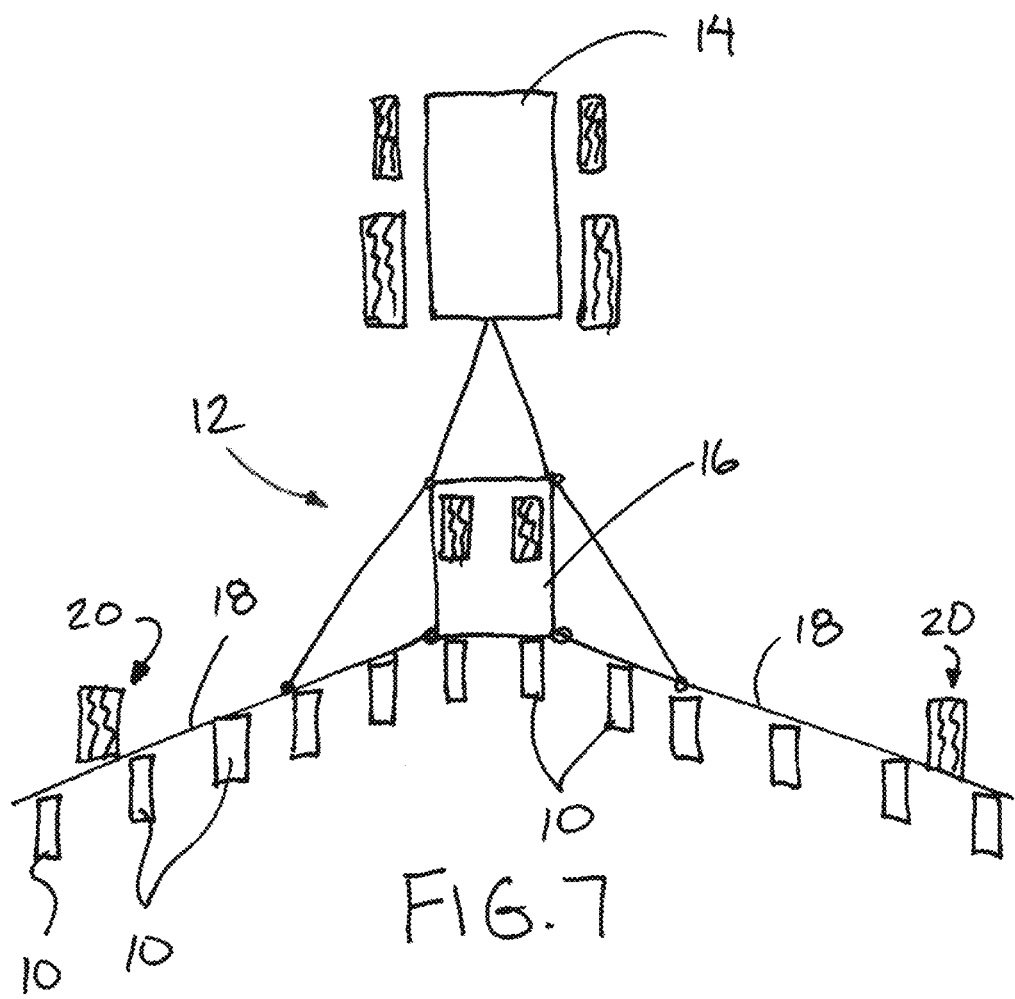
FIG. 7 is a schematic representation of an exemplary agricultural implement upon which a plurality of the ground working apparatuses according to FIG. 1 are supported, in which the agricultural implement is shown connected in towing relationship with an agricultural tractor for movement across ground in a forward working direction.

According to one exemplary embodiment, the implement 12 may be a winged implement as represented schematically in FIG. 7. In the illustrated example, the implement 12 includes a frame having a centre section 16 arranged for towing connection to the agricultural tractor 14 while being carried on respective wheels for rolling movement in the forward working direction. The frame further includes two wing sections 18 which extend laterally outward from opposing sides of the center section in a field position. The wing sections 18 are pivotal between the field position and a transport position in which the wing sections extend generally rearward from the centre section 16. Each section of the frame includes a toolbar 17 arranged to support a plurality of the ground working apparatuses 10 thereon. In the illustrated embodiment, the toolbar sections on the wing sections 18 of the frame are sloped non-perpendicularly to the forward working direction to extend laterally outward at a rearward slope in the field position.

Each wing section is supported by one or more wheel units 20 which are arranged to be adjustable in height relative to the frame to raise and lower the frame relative to the ground by adjustment of the wheel height. Each wheel unit includes a mounting frame arranged to be mounted in fixed and immovable relation to the respective toolbar. The mounting frame includes a front angle adapter 22 in the form of a structural tube fixed to the toolbar to extend forwardly, parallel to the forward working direction. The mounting frame further includes a pair of parallel mounting plates 24 which are parallel and spaced apart from one another and parallel to the forward working direction. One of the plates 24 is fixed to the front end of the front angle adapter 22 while another one of the plates 24 is fixed to the toolbar at a location where an imaginary axis perpendicular to the forward working direction and passing through the front end of the front angle adapter 22 intersects the toolbar.

Each wheel unit further includes a wheel frame 26 which supports a vertical pivot shaft 28 thereon and which is coupled to the parallel mounting plates 24 of the mounting frame by an upper link 30 and a lower link 32 forming a parallel linkage. In this manner pivoting of the linkage allows the wheel frame 26 to vary in elevation relative to the toolbar while maintaining the vertical pivot shaft in a substantially vertical orientation.

A wheel arm 34 is supported on the bottom end of the pivot shaft 28 below the wheel frame 26 to be rotatable about the upright axis of the pivot shaft. The wheel arm 34 is sloped downwardly and rearwardly from the pivot shaft to a lower end rotatably supporting a ground wheel 36 thereon. In a normal forward orientation of the implement, the wheel arm is sloped downwardly and rearwardly to the wheel 36 which is rotatable about a lateral axis oriented perpendicularly to the forward working direction.

The wheel arm 34 and the wheel 36 rotatable on the wheel arm are pivotal about the upright axis of the pivot shaft through a range of 90 degrees between a field position in which the wheel is supported for rolling movement in the forward working direction when the wing sections are in the field position, and a transport position in which the wheel is supported for rolling movement in the forward working direction when the wing sections are trailing rearward in the transport position.

A locking pin 38 is arranged to be inserted through cooperating apertures in the wheel frame 26 and the wheel arm 34 to selectively lock the wheel arm in either one of the field position or the transport position.

A crank arm 40 is supported at an intermediate location on the lower link to extend upwardly therefrom such that a linear hydraulic actuator 42 operatively connected between the implement frame and the crank arm 42 acts to raise and lower the wheel frame relative to the implement frame by extending and retracting the length of the actuator 42. The actuator 42 is supported on the implement frame using a rear angle adapter 44 in the form of a rigid structural tube protruding rearwardly from the toolbar in parallel relation to the forward working direction when the toolbar is sloped in the field position thereof. One end of the hydraulic linear actuator is pivotally connected onto the crank arm 40 and the opposing end of the hydraulic linear actuator is pivotally connected on the rear angle adapter 44.

Figure 3:
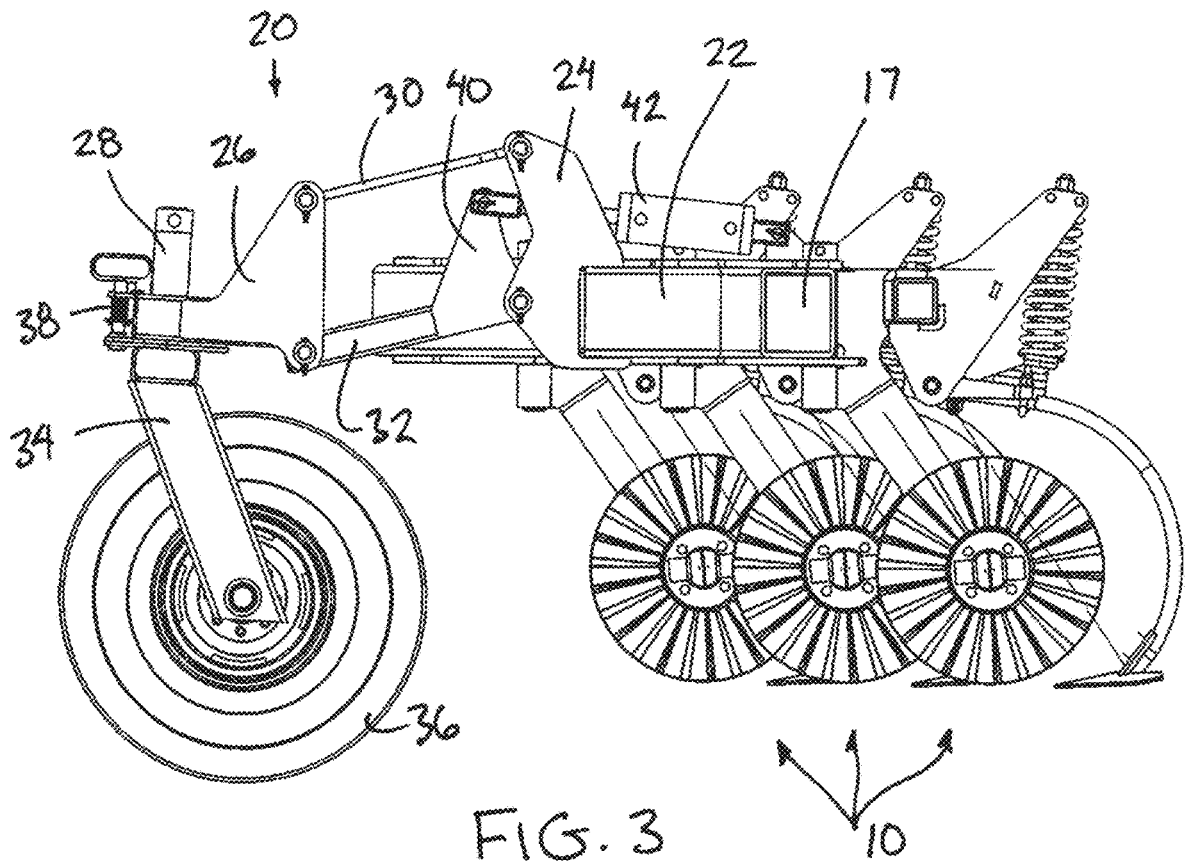
FIG. 3 is a side elevational view of the ground working apparatus according to FIG. 1.
Figure 4:
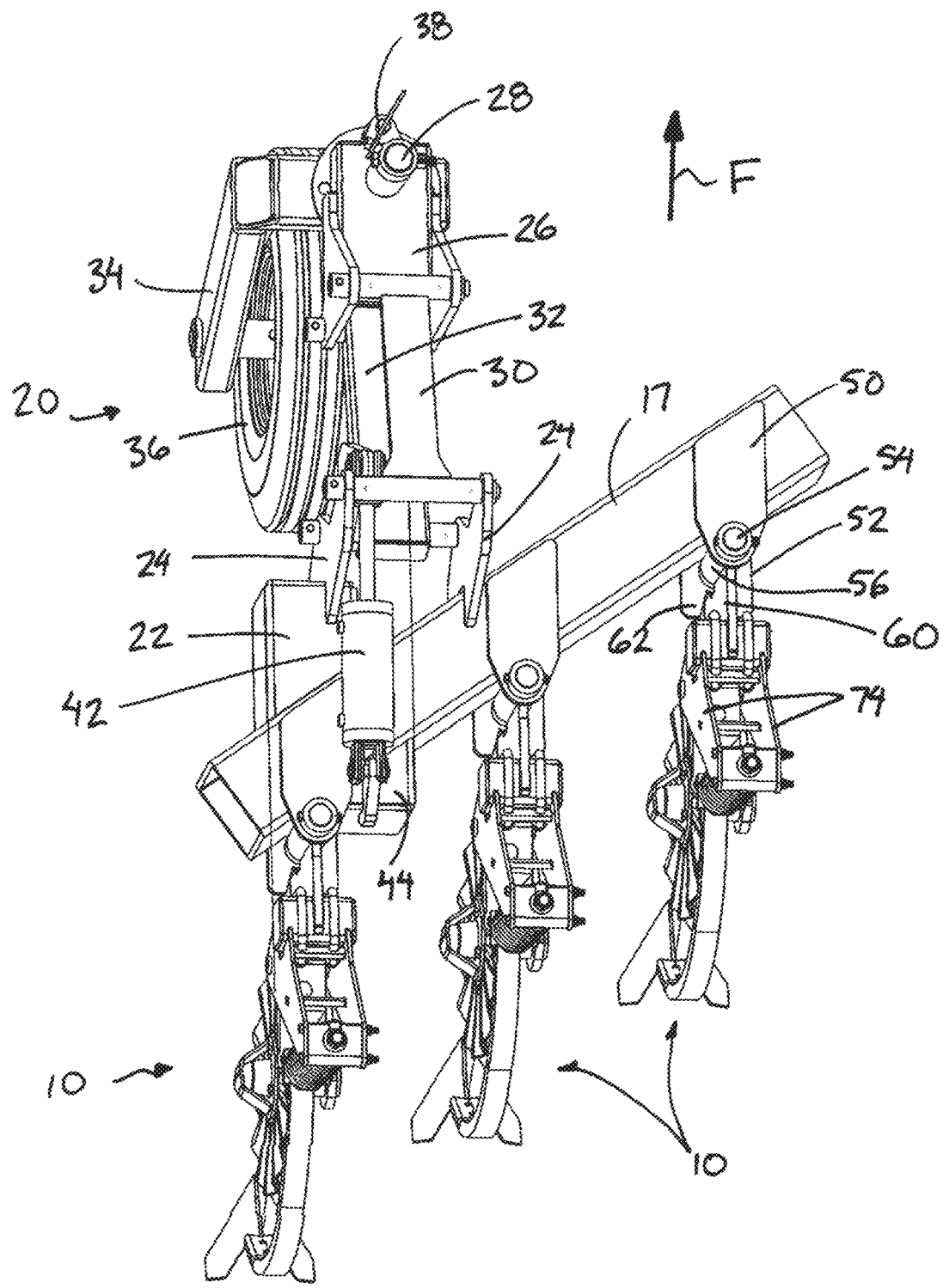
FIG. 4 is a perspective top view of the ground working apparatus according to FIG. 1.
Figure 5:
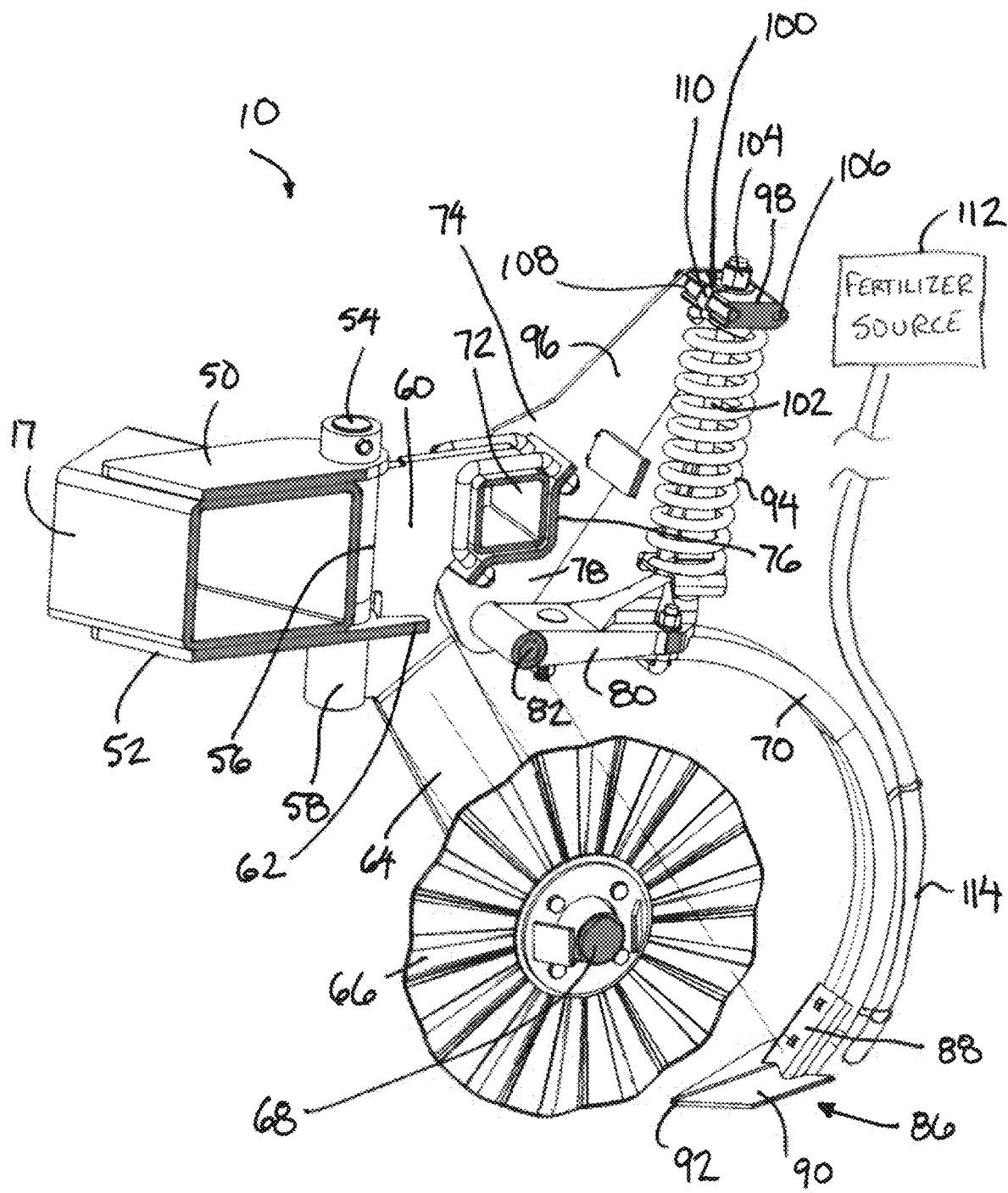
FIG. 5 is a partly sectional perspective side view of the ground working apparatus according to FIG. 1.
Figure 6:
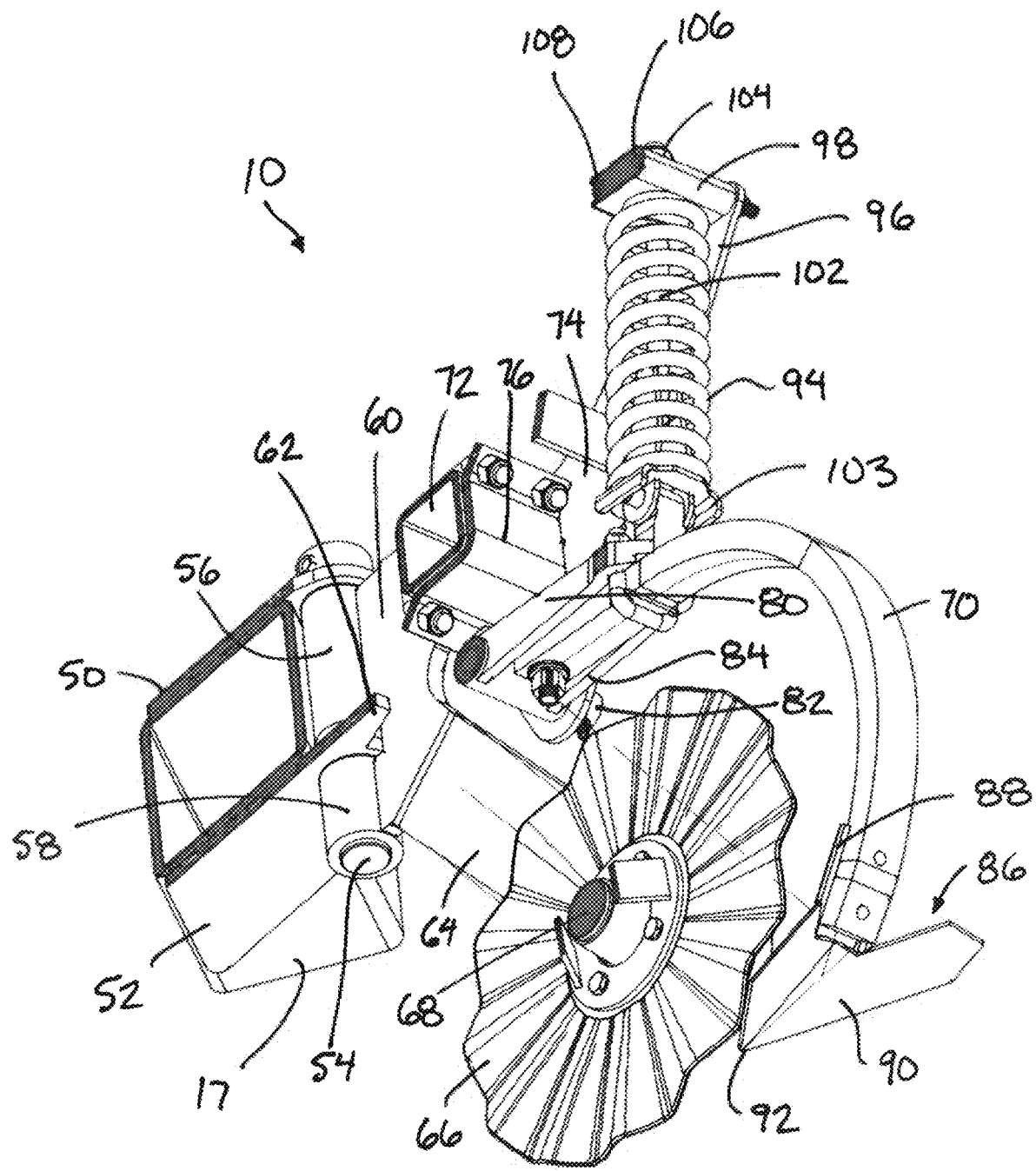
FIG. 6 is another perspective view of the partly sectional ground working apparatus of FIG. 5.

Extending and retracting the actuator 42 allows the wheel to be operated through a full range of motion including a lowered wheel position as shown in FIG. 3 in which the bottom of the wheel is spaced well below the bottom of the ground working apparatuses 10 such that the ground working apparatuses do not engage the ground, and a raised wheel position in which the bottom of the wheel is spaced above the bottom of the ground engaging apparatuses 10 so that the ground engaging apparatuses carry the weight of the implement across the ground for penetration of the ground working components of the apparatuses 10 into the ground as described in further detail below.

Each apparatus 10 is independently mounted onto the respective toolbar of the implement by a respective mounting bracket consisting of an upper plate 50 and a lower plate 52. The upper and lower plates are mounted flat against the top and bottom surfaces of the toolbar to extend horizontally rearward. The leading edges of the plates are sloped at the angle of the toolbar such that the opposing parallel side edges of each plate extends rearward parallel to the forward working direction of the implement while the leading edge of each plate remains parallel to the toolbar. The plates are welded fixed and immovably relative to the toolbar.

An upright pivot assembly of the apparatus includes a vertical pivot shaft 54 connected vertically between the upper and lower plates 50 and 52 at a location spaced slightly rearward from the toolbar. An upper sleeve 56 is rotatably supported on the pivot shaft to span a height between the upper and lower plates to constrain the sleeve axially along the pivot shaft while remaining rotatable about the shaft. A lower sleeve 58 is rotatably supported about a bottom end of the pivot shaft that protrudes below the lower plate 52. A mounting plate 60 is welded in fixed relation to both the upper and lower sleeves to extend rearward and parallel to the forward working direction in a neutral position of the apparatus.

The lower plate includes two protrusions 62 extending rearward at opposing sides of the mounting plate 60 having inner edges forming a V-shaped notch receiving the mounting plate 60 therein such that the mounting plate 60 is pivotal with the upper and lower sleeves about the pivot shaft through a range of approximately 25 degrees in either direction from the neutral position so that the mounting plate can pivot through an overall range of approximately 50 degrees.

Each apparatus 10 further includes a disc arm 64 formed continuously and uniformly in a seamless and integral manner with the mounting plate 60. The disc arm 64 is sloped downwardly and rearwardly from an upper end joined to the mounting plate 60 of the upright pivot assembly to a lower end rotatably supporting a coulter disc 66 thereon. In addition to being sloped downwardly and rearwardly, the disc arm is also sloped laterally outwardly away from a neutral plane of the mounting plate from the upper end to the lower end thereof such that the lower end is spaced laterally outwardly from the neutral plane. The disc arm 64 pivots together with the mounting plate about the upright axis of the pivot shaft 54.

The coulter disc 66 is rotatably supported about a disc axis oriented laterally and perpendicularly to the neutral plane of the mounting plate. The disc is rotatably supported by bearings on an axle 68 mounted to the lower end of the disc arm 64 to define the disc axis. The coulter disc 66 is spaced laterally inwardly from the lower end of the disc arm along the axle 68 such that the disc is rotatable substantially within the neutral plane of the mounting plate. The disc axis is perpendicular to the forward working direction in the neutral position of the apparatus when displaced in the normal forward working direction of the implement.

A tool shank 70 is supported in trailing relation to the disc arm by a mounting arrangement supported on the mounting plate 60 at the upper end of the disc arm 64. The mounting arrangement of the tool shank 70 includes a crossbar 72 formed of a rigid structural tube that is welded in fixed and immovable relation to the mounting plate 60 to protrude laterally outwardly from either side of the mounting plate in perpendicular relation to the mounting plate. The mounting arrangement further includes two side plates 74 mounted at opposing ends of the crossbar 72 so as to be perpendicular to the crossbar and parallel to the mounting plate 60 while being spaced outwardly from opposing sides of the mounting plate respectively.

The side plates 74 of the mounting arrangement are removably supported on the crossbar using threaded fasteners. More particularly, a crossmember 76 of L-shaped cross section extends laterally between the two side plates 74 to be welded in fixed and immovable relation to the side plates. The L-shaped cross-section of the crossmember 76 is formed by two flanges which mate against corresponding bottom and rear surfaces of the crossbar 72 in a mounted position. Threaded fasteners extend about the crossbar and are secured at opposing ends to the crossmember 76 to clamp the crossmember against the crossbar 72 in the mounted position while being removable for replacement as desired.

Each of the side plates 74 includes a lower portion 78 extending below the crossbar 72 in proximity to the upper end of the disc arm for pivotally supporting a shank support body 80 thereon. More particularly, a pivot shaft 82 extends laterally between the side plates 74 to define a lateral axis about which the tool shank 70 pivots in use. A sleeve is formed at the forward end of the shank support body 80 through which the shaft 82 is received such that the shank support body 80 is pivotal about the lateral axis of the pivot shaft. The shank support body includes a longitudinal channel 84 formed along the bottom side thereof to receive the upper end of the tool shank therein. A pair of longitudinally spaced threaded fasteners secure an upper end portion of the tool shank fixedly and immovably within the longitudinal channel 84 along the bottom of the shank support body 80 such that the tool shank 70 pivots together with the shank support body 80 about the lateral axis of the pivot shaft 82. The lateral axis of the tool shank is located upwardly and forwardly in relation to the disc axis so as to be located in proximity to the upper end of the disc arm. Removal of the threaded fasteners allows the tool shank to be removed and interchanged as desired.

The tool shank 70 lies generally within the neutral plane of the coulter disc 66 and extends generally rearwardly and downwardly from the upper end of the tool shank mounted on the shank support body 80 to an opposing lower end of the tool shank supporting a shovel 86 thereon. A majority of the tool shank is curved along the length thereof such that a centre of curvature of the tool shank lies approximately at the disc axis in a normal working position of the tool shank relative to the disc arm.

The shovel 86 mounted on the lower end of the tool shank includes a shank mount 88 in the form of a longitudinal channel receiving the lower end of the tool shank therein and a shovel body 90 mounted at the bottom end of the shank mount for forming an undercut trough in the ground as described in further detail below. More particularly, the shovel includes (i) a forward portion protruding forwardly from the bottom end of the shank mount to a forward apex 92 of the shovel and (ii) a pair of wing portions extending rearwardly and laterally outwardly from the forward apex 92 to protrude laterally outwardly from opposing sides of the tool shank 70.

A pressure mechanism is provided for maintaining a downward pressure on the shovel as the shovel is displaced forwardly through the ground. More particularly, the pressure mechanism maintains the shovel in a normal working position until upward and rearward pressure on the shovel exceeds a prescribed holding force of the pressure mechanism at which point the shovel and the tool shank upon which it is mounted pivots upwardly and rearwardly about the lateral axis of the pivot shaft. The pressure mechanism returns the shovel to the normal working orientation once the excessive pressure has subsided. The pressure mechanism includes a spring 94 which is operatively connected between the tool shank and an upper portion 96 of each of the side plates 74 at a location spaced upwardly and rearwardly from the toolbar.

The spring 94 is mounted to the upper portions 96 of the side plates by a mounting block 98 that is mounted laterally between the side plates 74 at the top end thereof. The mounting block 98 includes a slot 100 formed therein which is open to the forward side of the block. A guide shaft 102 is pivotally supported at the bottom end thereof on the top side of the shank support body 80 at a location spaced rearward from the pivot shaft 82 while extending upwardly through the front slot 100 at the top end of the guide shaft. A fastener, for example a threaded nut 104 is secured onto the upper end of the guide shaft 102 above the mounting block 98. The fastener 104 abuts the top side of the mounting block in the normal working position of the tool shank to define a lower limit or lowermost position of the shovel relative to the disc corresponding to the shovel being approximately at the elevation of a bottom edge of the disc.

When the prescribed holding force is exceeded, and the tool shank is pivoted upwardly, the guide shaft 102 is free to slide upwardly through the slot 100 in the mounting block. The spring 94 of the pressure mechanism is a helical spring supported about the guide shaft and axially constrained between the shank support body 80 at the bottom end and the mounting block 98 at the top end thereof. The spring is mounted under compression to define the prescribed holding force that maintains downward pressure on the tool shank. When an obstacle is encountered, resulting in pressure on the shovel that exceeds the prescribed holding force, upward pivoting of the tool shank causes the spring to be compressed; however, once the obstacle has passed, the spring returns the shovel to the normal working elevation.

The mounting block 98 is supported between the side plates 74 by a rear cross bolt 106 penetrated through the mounting block and each of the side plates to fix the block to the side plates at a location rearward of the slot 100 in the guide block. The mounting block is further secured by a front cross bolt 108 that passes through the side plates and the mounting block at a location passing through the front slot 100. The front cross bolt 108 is at a location spaced forward from a rear terminal end of the slot 100 by a distance corresponding to the dimension of the guide shaft to allow the guide shaft to be constrained in the forward working direction between the rear terminal end of the slot 100 at the rear and the front cross bolts 108 at the front of the guide shaft. A rotatable bushing 110 is supported about the front cross bolt 108 in alignment with the guide shaft to encourage free sliding movement of the guide shaft upwardly through the slot.

In the event that the spring is broken and requires replacement, the front cross bolt 108 can be removed so that the guide shaft can be displaced forwardly at the top end thereof to remove the guide shaft from the mounting block 98 so that the spring can be removed axially from the top end of the guide shaft and a new spring can be inserted over the top end of the guide shaft. Compressing the new spring while displacing the top end of the guide shaft rearwardly into the slot 100 allows the front cross bolt 108 to be replaced to constrain the guide shaft in the mounting block and retain the replacement spring between the guide block and the shank support body 80 therebelow.

Alternatively, the assembly of the guide shaft 102, the mounting block 98 at the top of the guide shaft, a bottom plate 103 at a bottom of the guide shaft, and the spring 94 constrained on the guide shaft between the mounting block 98 and the bottom plate 103 can be removed and interchanged as a unit by removing the rear cross bolt 106 and removing a fastener that couples the bottom plate 103 to the shank support body 80. This is permitted by the front cross bolt being received within a forward facing channel in the mounting block 98 so as to allow removal of the mounting block while the front cross bolt 108 remains mounted between the side plates 74.

A fertilizer source 112 such as a liquid fertilizer tank is typically supported on the frame of the implement. Each apparatus 10 includes a fertilizer injector tube 114 mounted along the rear side of the tool shank such that an open discharge end of the injector tube is positioned in close proximity to the bottom end of the tool shank in trailing relation with the shovel 86. Suitable conduits communicate between the fertilizer source 112 and the injector tubes 114 for pumping liquid fertilizer from the source to the injector tubes while the implement is displaced across the ground in the forward working direction.

In use, for injecting fertilizer into the ground, the wing sections are initially positioned in the field position and the wheels are raised into the raised position so that the weight of the implement is carried on the ground working apparatuses 10. As the tractor is displaced in a forward working direction, the implement frame follows the tractor to displace the apparatuses 10 across the ground. In doing so, the disc 66 of each apparatus 10 forms a cut into the ground and the shovel follows the disc such that the tool shank is aligned with the cut in the ground while the shovel is received below the surface of the ground to lift a shelf of earth on each side of the cut and thereby form an undercut trough or void in the ground which is wider than the initial cut of the disc. The fertilizer injector of the apparatus injects the liquid fertilizer into the undercut trough or void in the ground immediately rearward of the shovel. The undercut trough is subsequently closed by the raised shelf of earth falling back over top of the injected fertilizer after passage of the shovel.

By supporting the disc arm of each apparatus such that it can only pivoted about the upright axis relative to the mounting bracket and toolbar upon which it is supported while preventing any upward movement of the disc arm, the weight of the implement frame is carried on the discs of the apparatuses so that any small obstacles such as rocks encountered by the discs tend to be pushed deeper into the ground for clearing a path for the shovel. The shovel can thus remain below the surface of the ground for injecting fertilizer as the shovel passes the rock.

The upright pivot axis of each apparatus relative to the toolbar also allows the disc and following shovel to be displaced laterally away from the neutral position thereof in response to lateral forces when the tractor and towed implement follow a curved path across the ground.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A ground working apparatus for use with an agricultural implement having a toolbar arranged to be displaced across ground in a forward working direction, the ground working apparatus comprising:
   a mounting bracket arranged to be mounted on the toolbar in fixed relation to the toolbar;
   a disc arm extending downwardly and rearwardly between an upper end of the disc arm and a lower end of the disc arm;
   an upright pivot assembly pivotally coupling the upper end of the disc arm relative to the mounting bracket such that the disc arm is pivotal about an upright axis relative to the mounting bracket;
   a coulter disc rotatably supported on the lower end of the disc arm so as to form a cut in the ground when displaced in the forward working direction, the coulter disc being rotatable about a disc axis;
   the upright pivot assembly preventing upward movement of the coulter disc relative to the mounting bracket;
   a tool shank extending downwardly and rearwardly between an upper end of the tool shank and a lower end of the tool shank;
   a lateral pivot assembly pivotally coupling the upper end of the tool shank relative to the disc arm such that the tool shank is pivotal relative to the disc arm about a lateral axis;
   the tool shank being coupled relative to the disc arm so as to be pivotal with the disc arm relative to the mounting bracket about the upright axis of the upright pivot assembly;
   a pressure mechanism arranged to prevent upward pivotal movement of the tool shank relative to the disc arm until an upward pressure applied to the tool shank exceeds a prescribed holding force of the pressure mechanism; and a shovel supported on the lower end of the tool shank to form an undercut trough connected to the cut in the ground for receiving fertilizer from a fertilizer injector supported rearwardly of the tool shank.

2. The ground working apparatus according to claim 1 wherein the lateral axis of the lateral pivot assembly is adjacent to the upper end of the disc arm.

3. The ground working apparatus according to claim 1 wherein the lateral axis of the lateral pivot assembly is forward of the disc axis of the coulter disc.

4. The ground working apparatus according to claim 1 wherein the tool shank is curved about a center of curvature in which the center of curvature lies in proximity to the disc axis.

5. The ground working apparatus according to claim 1 wherein the lower end of the disc arm is spaced laterally outwardly from a plane of rotation of the coulter disc and wherein the disc arm is sloped towards said plane of rotation from the lower end to the upper end of the disc arm.

6. The ground working apparatus according to claim 1 in combination with the agricultural implement, wherein the toolbar extends non-perpendicularly to the forward working direction and wherein the mounting bracket extends rearward from the toolbar in parallel with the forward working direction.

7. The ground working apparatus according to claim 1 wherein the disc arm is pivotal about the upright axis through a range of at least 25 degrees in either direction from a neutral position of the disc arm in which the disc axis is oriented perpendicularly to the forward working direction.

8. The ground working apparatus according to claim 1 in combination with a supply of liquid fertilizer in communication with the fertilizer injector supported on the tool shank, the fertilizer injector being supported on the tool shank so as to be movable together with the shovel about the lateral axis of the lateral pivot assembly.

9. A ground working apparatus for use with an agricultural implement having a toolbar arranged to be displaced across ground in a forward working direction, the ground working apparatus comprising:

a mounting bracket arranged to be mounted on the toolbar in fixed relation to the toolbar;

a disc arm extending downwardly and rearwardly between an upper end of the disc arm and a lower end of the disc arm;

an upright pivot assembly pivotally coupling the upper end of the disc arm relative to the mounting bracket such that the disc arm is pivotal about an upright axis relative to the mounting bracket;

a coulter disc rotatably supported on the lower end of the disc arm so as to form a cut in the ground when displaced in the forward working direction, the coulter disc being rotatable about a disc axis;

the upright pivot assembly preventing upward movement of the coulter disc relative to the mounting bracket;

a tool shank extending downwardly and rearwardly between an upper end of the tool shank and a lower end of the tool shank;

a lateral pivot assembly pivotally coupling the upper end of the tool shank relative to the disc arm such that the tool shank is pivotal relative to the disc arm about a lateral axis while being pivotal with the disc arm about the upright axis of the upright pivot assembly;

a pressure mechanism arranged to prevent upward pivotal movement of the tool shank relative to the disc arm until an upward pressure applied to the tool shank exceeds a prescribed holding force of the pressure mechanism; and a shovel supported on the lower end of the tool shank to form an undercut trough connected to the cut in the ground for receiving fertilizer from a fertilizer injector supported rearwardly of the tool shank;

wherein the lateral axis of the lateral pivot assembly is forward of the disc axis of the coulter disc.

* * * * *